United States Patent [19]
Elmes

[11] 4,455,083
[45] Jun. 19, 1984

[54] METHOD AND APPARATUS FOR FINGERPRINT VERIFICATION OF IDENTITY

[76] Inventor: Paul B. Elmes, P.O. Box 24-C-29, Los Angeles, Calif. 90024

[21] Appl. No.: 295,647

[22] Filed: Aug. 24, 1981

[51] Int. Cl.³ .............................................. G06K 9/74
[52] U.S. Cl. ..................................................... 356/71
[58] Field of Search ........................... 356/71; 382/4–5, 382/7; 283/7, 8 R, 8 A, 8 B; 428/916

[56] References Cited

U.S. PATENT DOCUMENTS

| | | | |
|---|---|---|---|
| 1,135,919 | 4/1915 | Pilkington | 356/71 |
| 2,646,717 | 7/1953 | Selgin | 356/71 |
| 2,964,641 | 12/1960 | Selgin | 356/71 |
| 3,241,431 | 3/1966 | Brutten et al. | 356/71 |
| 3,398,558 | 8/1968 | Benenati | 356/71 |
| 3,584,958 | 6/1971 | Miller | 356/71 |
| 4,202,120 | 5/1980 | Engel | 356/71 |
| 4,253,086 | 2/1981 | Szwarcbier | 356/71 |

Primary Examiner—William H. Punter

[57] ABSTRACT

A method and apparatus is disclosed for verifying the fingerprint of the bearer of a card by comparing the fingerprint of the bearer with the fingerprint of the person to whom the card is issued. First a negative of the fingerprint of the person to whom the card is issued is imprinted with reflective material in a transparent region of the card. By placing the card on a surface with the transparent region over a window, a beam of light is directed at the transparent region through the window for reflection of light back to a circuit where the level of reflected light is detected. Upon placing the finger of the bearer of the card over the imprinted negative fingerprint with proper registration for matching the fingerprint of the bearer with the imprinted negative fingerprint, the level of reflection is increased. A match is verified by observing a predetermined minimum level of reflection of light from the imprinted negative fingerprint and the fingerprint of the bearer. A reference level of reflection from the imprinted negative fingerprint alone is first established for comparison with the level of reflection of light from the imprinted negative fingerprint and the fingerprint of the bearer.

6 Claims, 5 Drawing Figures

METHOD AND APPARATUS FOR FINGERPRINT VERIFICATION OF IDENTITY

BACKGROUND OF THE INVENTION

This invention relates to a method and apparatus for fingerprint verification of identity, and more particularly for verification that a person presenting a card, such as for credit, is the one to whom the card has been issued by comparing the persons' fingerprint with one on the card.

The use of cards for credit and other purposes has become so widespread that preventing the use of lost or stolen cards has become a major problem. One possible solution is the use of a secret code in conjunction with an individual code, as described in U.S. Pat. No. 4,198,619, for personal verification. A coded check system described in U.S. Pat. No. 3,824,544 is typical of that approach, but the approach requires the use of a computer for the necessarily complex decoding operation.

A more direct approach which does not necessarily require a computer is the use of a fingerprint on the card for identification. While several systems using this approach have been proposed, they are too complex to be practical in their entirety, such as the system disclosed in U.S. Pat. No. 4,202,120, or in their implementation, such as disclosed in U.S. Pat. Nos. 3,947,128 and 4,053,228 which require oscillating an image of a fingerprint relative to a permanent record for comparison, or scanning the fingerprint with a light beam and correlating the reflected beam with a hologram of a permanent record of the fingerprint.

The present invention uses a transparency of the permanent record for a direct comparison of a person's fingerprint. Others have proposed such an approach, but the implementations have been too complex to be of practical use on a wide scale due to the optical elements required to focus the images on a focal plane where one is superimposed on the other. See for example U.S. Pat. Nos. 3,398,558, 3,584,958 and 3,619,060, which best exemplify the prior art. An object of this invention is to provide a simple and direct method and apparatus for comparing a fingerprint of a person presenting a card with a fingerprint recorded on the card without the use of optical elements for focusing and superimposing images.

SUMMARY OF THE INVENTION

In accordance with the present invention, permanent negative fingerprint is made on a transparent area of a card using reflective material. Borders of the area are coated with nonreflective material. All of the surface in the transparent area of the card imprinted with a fingerprint will thus reflect light only at the interface of the transparent material of the card in that region and the reflective material. If a finger is now pressed over the specified region, the surface area not coated with reflective material will also reflect light, thus increasing the amount of light reflected, and the amount of increase will depend upon the extent to which the actual (positive) fingerprint matches the negative fingerprint. For maximum reflection, not only must there be correspondence of the actual fingerprint with the negative, but also registration. A threshold light detector is used to determine when there is sufficient correspondence between the actual and the negative fingerprint, thereby verifying that the person presenting the card is the person to whom the card has been issued. If a match fails due to lack of registration, the person presenting the card may adjust the position and/or pressure of the finger used against the specified region until the predetermined minimum increase has been achieved. The system may be adapted to verify a fingerprint by the reflection or change in the level of reflection of light, rather than an absolute level of reflection so that the system will not depend upon the stability of the intensity of the light source and the sensitivity of the detector, both of which often depend upon the stability of their power supply.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
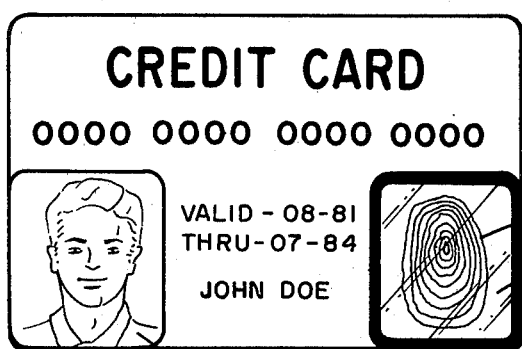
FIG. 1 illustrates a typical card adapted for use in the present invention.
Figure 2B:
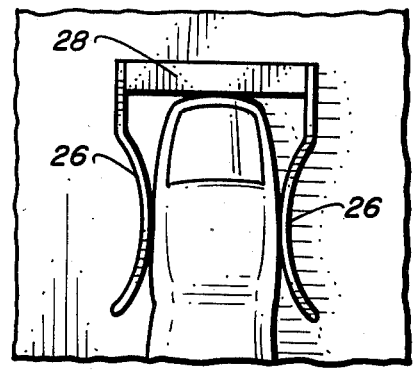
FIG. 2b illustrates in a plan view a guide for a finger to be placed over the transparent region of a credit card on which a fingerprint negative has been imprinted.
Figure 2A:
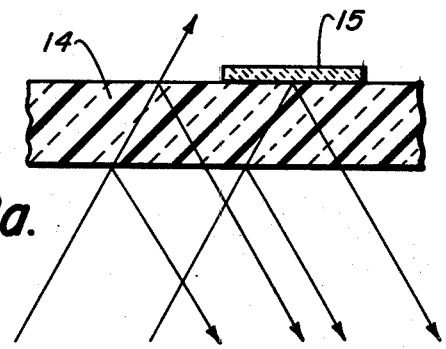
FIG. 2a is a cross section of a portion of a transparent region in a credit card with a part of a fingerprint negative imprinted with reflective material.

Referring now to the drawings, FIG. 1 illustrates a credit card 10 having the usual indicia, and possibly a photograph 12 of the cardholder in the lower left corner. In addition, there is a transparent region 14 on the surface of which a negative fingerprint of the cardholder has been imprinted with reflective material 15 such as white or silver material using photographic techniques, or other techniques such as silkscreening used in the arts, the term "imprinted" is to be liberally interpreted and not restricted to printing by pressure. The imprinted negative fingerprint reflects light at the interface of the material with the transparent region. A border surrounding the fingerprint is preferably imprinted with nonreflective material, such as black ink, so that when the card is placed over a window 16 on the top 18 of a box (not shown) containing a light source 20 and a photocell 22, light will be reflected from the interface as shown in FIG. 2a, and registration of the region 14 over the window 16 will not be critical. A metal tube 21 shrouds the light path from the source 20 to the window 16, and a metal tube 23 shrouds the light path from the window 16 to the photocell.

Some light will be reflected by the front face of the transparent material, but as will be appreciated from the following description, that light will only affect the sensitivity of the system. Nevertheless, to minimize that light, an angle of incidence is selected for minimum reflection from the front face. In that manner, maximum light will pass through the transparent material for reflection by the negative of a fingerprint, i.e., where reflective material has been imprinted. Where there has not been reflective material imprinted, the light passing through the transparent material will, of course, pass out of the material with very little reflection, as shown in FIG. 2a. Most of the light which reaches the negative fingerprint is reflected. As a consequence, for any given card having a negative of a fingerprint imprinted on the upper surface of the region 14, a photocell 22 will detect an amount of light to produce a signal that is below a predetermined reference level for a threshold detector 24.

Once a finger is placed over the region 14, light which might otherwise pass out of the transparent material unreflected will be reflected by the interface between the actual (positive) fingerprint and the transparent material, thereby increasing the signal level of the photocell 22. The increase will be proportional to the extent to which the fingerprint of the finger placed on the region 14 correlates with the negative fingerprint imprinted. The reference level of the threshold detector 24 may be set to provide an output signal only when there is a predetermined minimum correlation manifested by a predetermined increase of reflected light.

It may sometimes be a problem in properly registering the finger placed on the region 14, even if guides are provided, because of the great variation in the size of fingers from one person to the next. To have as large a fingerprint as possible to work with, the thumb is to be preferred, but that is likely to vary even more among persons than, for example, the index finger. About all that can be done is to provide some guides to center the finger over the region 14, such as leaf springs 26 shown in FIG. 2b that press in equally on both sides of the finger, yet will yield to accommodate a finger of any width. A stop 28 of sufficiently small height to not come in contact with the fingernail will indicate how far in the finger should be inserted. If the same arrangement is used in making a negative of the fingerprint on the transparent material of region 14, registration of the finger will be reasonably close.

Notwithstanding the use of a guide as described with reference to FIG. 2b, the proper registration of the finger will be a problem, but by moving the finger about in the guide to roll it, turn it and/or move it in or out, proper registration can be achieved. Thus, the position of the finger may be adjusted until an output signal of sufficient level is achieved from the detector 24. That will normally occur only if the actual fingerprint of the finger matches the negative fingerprint imprinted on the card.

The success of the system will depend largely on the sensitivity of the photocell 22 and threshold detector 24. Consequently to increase sensitivity, a stable, high-gain dc amplifier 30 may be included between the photocell 22 and the detector 24. But still the system is vulnerable to change in the elements of the system due to age, temperature, etc., namely changes in the intensity of the light source, the sensitivity of the light detector, the gain of the amplifier, and the stability of the reference for the threshold detector. There is the further problem inherent in the cards themselves as to how much light is reflected due to the card not being clean. Another uncontrollable variable is the condition of the finger. However, any reasonably clean finger will allow satisfactory operation, so it is only the other elements of the system that must be taken into account.

Figure 2:
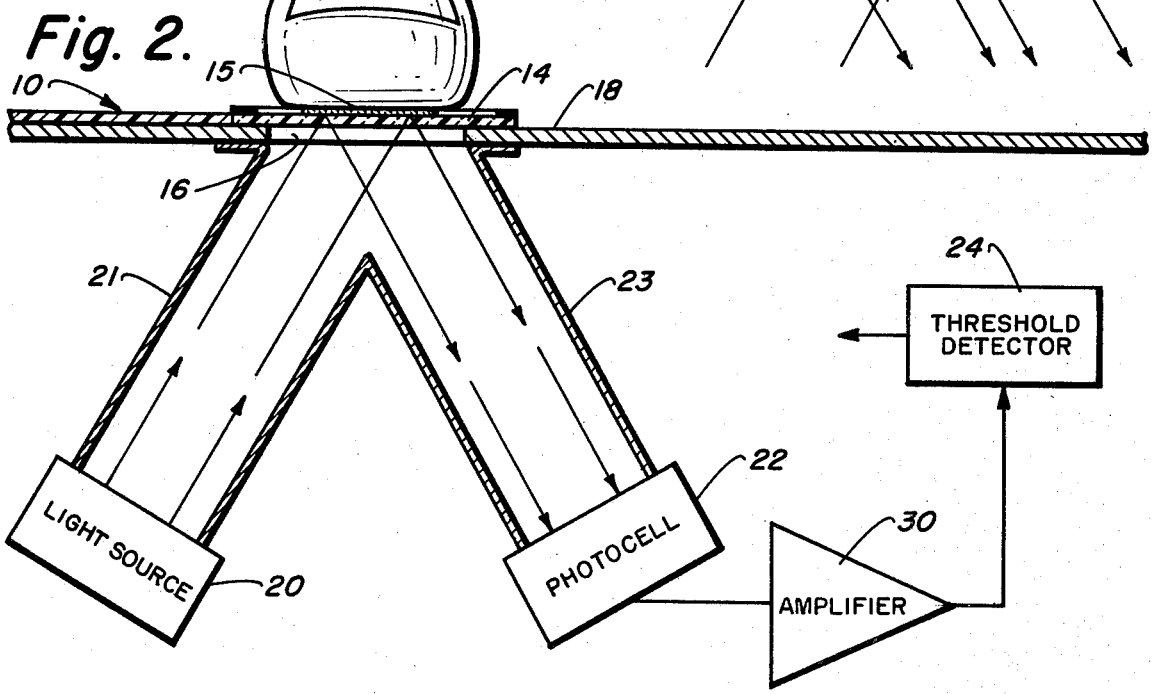
FIG. 2 illustrates schematically a system for using the card of FIG. 1 to verify that the bearer is the person to whom issued in accordance with the present invention.
Figure 3:
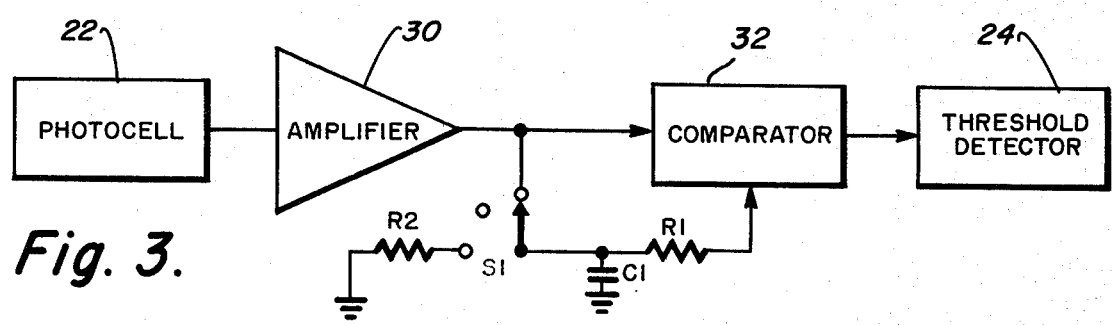
FIG. 3 is a diagram of an alternative arrangement for the circuit of FIG. 2.

To compensate for all of the other elements of the system, the circuit of FIG. 2 may be modified a shown in FIG. 3 by the inclusion of a circuit comprised of a switch $S_1$ which is placed in the position shown after the card has been placed on the holder 14, but before the finger has been placed on the card. This will charge a relatively large capacitor $C_1$ to store a reference signal proportional to the light from the source reflected by the negative fingerprint into the photocell. The switch $S_1$ is then placed in the middle (open circuit) position. A large resistor $R_1$ connects the charge in the capacitor $C_1$ to a high input impedance of the comparator. This large resistor adds to the high input impedance of the comparator for long term storage of the charge. The finger may then be placed on the card for fingerprint verification. Any increase in the amount of light reflected will cause a signal output from a comparator 32 to increase. It is this change in the output of the comparator that is then threshold detected. The sensitivity of the system may thus be increased without affecting reliability. Once the verification has been completed, the switch $S_1$ is placed in its third position to discharge the capacitor $C_1$ through a small resistor $R_2$ to ground.

From the foregoing it is evident that there is provided a method and apparatus for quickly and economically verifying negative fingerprints imprinted on cards with the actual (positive) fingerprint of the person bearing the card. Light from a source is maximally reflected when the actual fingerprint of a bearer matches the negative fingerprint on the card. Only a light source photocell and threshold detector are required. For greater sensitivity an amplifier is included, and for greater sensitivity and reliability, a circuit is added to provide for each card, a reference voltage directly proportional to light reflected by the negative fingerprint for comparison with an actual fingerprint.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. A method for verifying the fingerprint of the bearer of a card by comparing the fingerprint of the bearer with the fingerprint of the person to whom the card is issued comprising the steps of imprinting with reflective material a negative of the fingerprint of the person to thom the card is issued in a transparent region of the card, placing the card on a surface with the transparent region over a window, directing a beam of light at the transparent region through said window for reflection of light to a cicuit for detecting the level of reflected light, and placing the finger of the bearer of the card over the imprinted negative fingerprint with proper registration for matching the fingerprint of the bearer with the imprinted negative fingerprint, and verifying a match by observing a predetermined minimum level of reflection of light from the imprinted negative fingerprint and the fingerprint of the bearer.

2. A method as defined in claim 1 including the step of establishing a reference level of reflection from said imprinted negative fingerprint alone, comparing that reference level with the level of reflection of light from the imprinted negative fingerprint and the fingerprint of the bearer, and verifying a match by observing a predetermined increase of the level of reflection with respect to said reference.

3. A method as defined in claim 2 wherein said verifying step is carried out by comparing the reference level with the increased level, and detecting a predetermined minimum difference for verification.

4. Apparatus for verifying the fingerprint of the bearer of a card by comparing the fingerprint of the bearer with the fingerprint of the person to whom the card is issued, said card having a transparent region comprising means for imprinting with reflective material a negative of the fingerprint of the person to thom the card is issued in said transparent region of said card, means having a window for holding said card on a surface with said transparent region over said window, a circuit for detecting light; means for directing a beam of light at the transparent region through said window for reflection of light to said circuit for detecting the level of reflected light; whereupon placing the finger of the bearer of the card over the imprinted negative fingerprint with proper registration for matching the fingerprint of the bearer with the imprinted negative fingerprint, will permit verifying a match by observing a predetermined minimum level of reflection of light from the imprinted negative fingerprint and the fingerprint of the bearer.

5. Apparatus as defined in claim 1 including means for establishing a reference level of reflection from said imprinted negative fingerprint alone, means for comparing that reference level with the level of reflection of light from the imprinted negative fingerprint and the fingerprint of the bearer, whereby verifying a match is permitted by observing a predetermined increase of the level of reflection with respect to said reference.

6. Apparatus as defined in claim 2 wherein a match is carried out by means for detecting a predetermined minimum difference for verification between said reference level with the level of reflection of light from the imprinted negative fingerprint and the fingerprint of the bearer.

* * * * *